(12) United States Patent
Pradier et al.

(10) Patent No.: US 9,583,947 B2
(45) Date of Patent: Feb. 28, 2017

(54) METHOD OF DISTRIBUTING ELECTRICAL POWER TO ELECTRICAL OUTLETS IN A TRANSPORT VEHICLE AND AN ASSOCIATED COMPUTER PROGRAM

(71) Applicant: ECE, Paris (FR)

(72) Inventors: Jean-Clair Pradier, Houilles (FR); Jean-Pierre Balbinot, Kremlin Bicetre (FR); Stephane Le Garrec, Argenteuil (FR)

(73) Assignee: ECE, Paris (FR)

( * ) Notice: Subject to any disclaimer, the term of this patent is extended or adjusted under 35 U.S.C. 154(b) by 556 days.

(21) Appl. No.: 14/056,769

(22) Filed: Oct. 17, 2013

(65) Prior Publication Data

US 2014/0121850 A1    May 1, 2014

Related U.S. Application Data

(60) Provisional application No. 61/723,572, filed on Nov. 7, 2012.

(30) Foreign Application Priority Data

Oct. 25, 2012  (FR) ...................... 12 60171

(51) Int. Cl.
*H01R 13/64* (2006.01)
*H01R 13/60* (2006.01)
(Continued)

(52) U.S. Cl.
CPC ....... *H02J 4/00* (2013.01); *H02J 3/14* (2013.01); *Y02B 70/3225* (2013.01); *Y04S 20/222* (2013.01)

(58) Field of Classification Search
CPC ..... H02J 4/00; H02J 3/14; Y02B 70/3225; Y04S 20/222
(Continued)

(56) References Cited

U.S. PATENT DOCUMENTS

| 5,630,155 A * | 5/1997 | Karaki ............ F03G 1/00 322/100 |
| 2003/0085621 A1* | 5/2003 | Potega ............ B60L 11/185 307/18 |
| 2004/0021371 A1* | 2/2004 | Jouper ............ H02J 7/0031 307/29 |

FOREIGN PATENT DOCUMENTS

| DE | 10 2006 028823 A1 | 1/2008 |
| EP | 1 387 460 A2 | 2/2004 |

(Continued)

*Primary Examiner* — Robert Fennema
*Assistant Examiner* — Thomas Stevens
(74) *Attorney, Agent, or Firm* — Dentons US LLP

(57) ABSTRACT

A method of distributing electric current to electrical outlets, and a program to implement same, including the steps of supplying electric current to the electrical outlets not yet connected to an electronic device upon receipt of a distribution request from the electrical outlets; determining the instantaneous current intensity supplied to the electrical outlets; comparing the determined current intensity to a threshold referred to as the maximum threshold; and when the predetermined current intensity is greater than the maximum threshold, selecting an electrical outlet and terminating the supply of electric current to the selected electrical outlet. The steps of selection and termination being carried out while continuing the step of supplying electric current to the electrical outlets not yet connected to an electronic device upon receipt of a distribution request from the electrical outlets.

16 Claims, 6 Drawing Sheets

(51) Int. Cl.
*H01R 13/66* (2006.01)
*G05D 3/12* (2006.01)
*H02J 4/00* (2006.01)
*H02J 3/14* (2006.01)

(58) Field of Classification Search
USPC ............... 439/373, 535, 620, 620.3; 700/295
See application file for complete search history.

(56) References Cited

FOREIGN PATENT DOCUMENTS

| | | | |
|---|---|---|---|
| EP | 2 166 636 | A2 | 3/2010 |
| FR | 2 823 027 | A1 | 10/2002 |
| WO | 2011081943 | A2 | 7/2011 |

\* cited by examiner

METHOD OF DISTRIBUTING ELECTRICAL POWER TO ELECTRICAL OUTLETS IN A TRANSPORT VEHICLE AND AN ASSOCIATED COMPUTER PROGRAM

CROSS-REFERENCE TO RELATED APPLICATIONS

This application claims the benefit of priority of French Patent Application No. 1260171 filed Oct. 25, 2012, and U.S. Provisional Application No. 61/723,572, filed Nov. 7, 2012, all of which are incorporated by reference in their entirety herein.

BACKGROUND

The invention relates to a method of distributing electric current to the electrical outlets, seat control devices ("Seat Actuation Controllers") and video screens ("In Flight Entertainment") of a transport vehicle such as a plane or a train.

Electrical outlets are usually designed to receive personal electronic devices ("Passenger Electronic Device"), such as a laptop, tablet, or music player.

Seat control devices ("Seat Actuation Controllers") and video screens ("In Flight Entertainment") have priority and their supply of electric current is never cut.

Currently, the distribution method used in many aircraft allows connecting personal electronic devices to all electrical outlets as long as the total electrical power consumed by all outlets in the cabin remains below a first threshold. When this threshold is reached, electrical outlets that are already in service remain in service, but the connection of additional personal electronic devices to the remaining electrical outlets not yet connected to an electronic device is not permitted. A passenger who wants to connect his electronic device after a certain period of travel time, for example after an hour's flight, therefore may no longer be able to receive power because a significant number of passengers have already plugged in their electronic devices so that the level of instantaneous electric current being distributed is significant. The existing distribution method therefore cannot provide electric current to all passengers, because only the electronic devices connected before the first threshold is reached are served. Beyond that point, requests for electric current are ignored.

The purpose of the present invention is therefore to provide an alternative distribution method that distributes electrical power more equitably to all passengers.

In addition, if the electric power increases further after reaching the first threshold, either from increased consumption by electronic devices or from increased consumption of electrical power by the seat control devices and video screens, the electric current distribution is cut off across all electrical outlets of the cabin and the system resumes its cycle of authorization from the beginning.

Another goal of the invention is to reduce the number of such outage events for all passengers.

To this end, the invention relates to A method of distributing electric current from a power source to a plurality of electrical outlets in a transport vehicle, the method being implemented by a distribution system that comprises a central source of electric power and at least one set of distribution units, referred to as a column, comprising a plurality of local distribution units that are connected to each other and to the power source by a power line; each distribution unit being equipped with a control module and a plurality of electrical outlets capable of transmitting a distribution request to the control module when electronic devices are connected to said electrical outlets; wherein the method comprises the steps of:

a) reception of a distribution request from an electrical outlet not yet connected to an electronic device, called waiting electrical outlet;

b) supplying of electric current to said waiting electrical outlet;

c) determining the instantaneous electric current intensity supplied to all the electrical outlets already connected to an electronic device;

d) comparing the instantaneous current intensity determined in step c) to a threshold referred to as a maximum threshold $S_M^{outlets}$, $S_M^{co}$;

e) if the current intensity determined in step c) is greater than said maximum threshold $S_M^{outlets}$, $S_M^{col}$, computing the cumulative intensity of electric current supplied to each electric outlet already connected to an electronic device since the beginning of the step of supplying current to that electrical outlet;

selecting the electrical outlet that has supplied the highest cumulative intensity of electric current; and terminating the supply of current to said selected electrical outlet.

According to certain particular embodiments, the method of distribution comprises one or more of the following characteristics:

each distribution unit is capable of distributing electric current to the seat control devices and the video screens, and wherein the maximum threshold varies according to the instantaneous consumption of said seat control devices and said video screens.

steps a) to d) are applied by the control module of a distribution unit solely to the electrical outlets of this distribution unit.

when the current intensity determined in step b) is less than said maximum threshold, the method returns to step a).

the method further comprises the following steps:

e) comparing the current intensity determined in step b) with a threshold referred to as the safety threshold, said safety threshold being greater than said maximum threshold;

if the current intensity determined in step b) is greater than said safety threshold, f) selecting an electrical outlet and terminating the supply of electric current to said selected electrical outlet;

g) determining the current intensity supplied by the electrical outlets of said distribution unit;

h) comparing the current intensity determined in step g) to a threshold referred to as the hysteresis threshold, said hysteresis threshold being less than said maximum threshold;

if the current intensity determined in step g) is greater than said hysteresis threshold, repeating steps f) to h);

if the current intensity determined in step g) is less than said hysteresis threshold, the method returns to step b) of determining the current intensity supplied to the electrical outlets.

said method being implemented in a distribution system having a plurality of columns, each column comprising a plurality of distribution units connected to each other and to the power source by a power line; the method further comprises the following steps:

determining the instantaneous current intensity supplied to the electrical outlets of the distribution units of each column;

comparing the determined current intensity to a predetermined percentage of a column maximum threshold;

calculating a new maximum threshold specific to each column, in which the intensity of the current delivered to the electrical outlets of the distribution units is less than said predetermined percentage of said maximum threshold; said columns being referred to as columns with a surplus; and calculating a new maximum threshold defined for all of the columns, in which the intensity of the current delivered to the electrical outlets of the distribution units is greater than said predetermined percentage of said maximum threshold; said columns being referred to as columns with a deficit;

implementing steps a) to d) of the distribution method according to claim 1, using said new maximum threshold specific to each column with a surplus, on the distribution units of each column with a surplus, and using said corresponding new maximum threshold defined for all of the columns with a deficit, on the distribution units of the columns with a deficit.

the step of calculating a new maximum threshold specific to each column with a surplus comprises, for each column with a surplus, the following steps:

calculating the difference between the maximum threshold and a current intensity factor for the electric current distributed to the electrical outlets of the distribution units of each column with a surplus; and calculating the new maximum threshold specific to each column with a surplus, from said difference calculated for that column with a surplus, and wherein the calculation of the new maximum threshold defined for all of the columns with a deficit is a function of the sum of said differences calculated for all columns with a surplus.

The method comprises the following steps:

calculating a new hysteresis threshold specific to each column with a surplus, from the new maximum threshold specific to each column with a surplus;

calculating a new hysteresis threshold defined for all the columns with a deficit, from the new maximum threshold defined for all the columns with a deficit.

The invention also concerns a computer program stored on an information storage medium, said program comprising instructions for implementing the distribution method according to any one of features mentioned above, when said program is executed by a computer system.

The invention will be better understood by reading the following description, which is provided purely as an example and with reference to the drawings in which.

Figure 1:
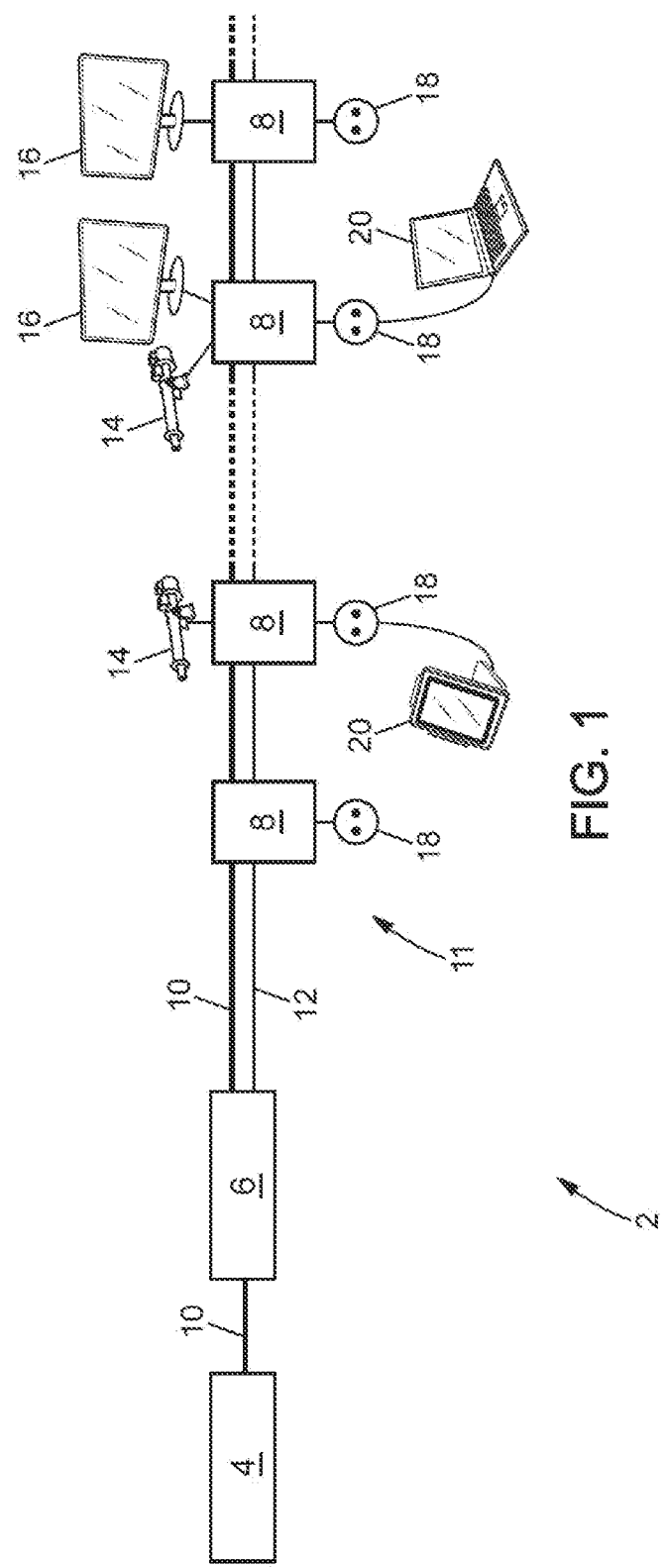
FIG. 1 is a schematic view of a distribution system having a single column, in which the method according to the invention may be implemented.

Referring to FIG. 1, the electric current distribution system 2 comprises a power source 4, a control unit 6 that is connected to the power source 4 by a power line 10, and a plurality of distribution units 8 serially connected to the control unit 6 by the power line 10. The set of distribution units 8 connected together form a column 11.

The power source 4, commonly called an EPDS ("Electrical Power Distribution System"), is capable of supplying the distribution units 8, commonly called an SPB ("Seat Power Box"), with a three-phase alternating current of 115 volts through the power line 10.

The control unit 6, commonly called an MCU ("Master Control Unit"), is also connected to the distribution units 8 by a communication line 12 generally called a "keyline". The control unit 6 is capable of transmitting a discrete signal to the distribution units 8 by means of the communication line 12. This discrete signal contains a unit maximum threshold $S_M^{SPB}$, a unit safety threshold $S_S^{SPB}$ and a unit hysteresis threshold $S_H^{SPB}$.

The control unit 6 is capable of determining the cases in which electric current cannot be distributed to the electrical outlets 18, such as during takeoff and landing of the aircraft for example. In these cases, the control unit gives a zero value to the three thresholds transmitted to the distribution units 8 so that they no longer authorize the supply of electric current to the electrical outlets 18 that request it.

Each distribution unit 8 is able to supply power to the seat control devices 14, video screens 16 and electrical outlets 18 suitable for connecting personal electronic devices 20 such as laptops. To simplify FIG. 2, only one electrical outlet 18 and a rectangle representing a seat control device 14 or video screen 16 are shown. In reality, each distribution unit 8 comprises at least four electrical outlets 18, at least one seat control device 14 and at least one video screen 16.

Figure 2:
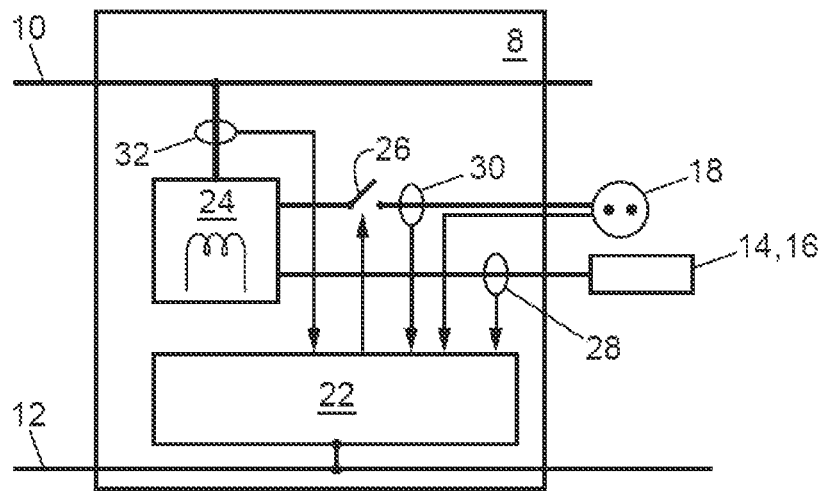
FIG. 2 is a simple diagram showing a distribution unit of the distribution system shown in FIG. 1.

Referring to FIG. 2, each distribution unit 8 further comprises a control module 22 which is connected to the communication line 12, and a power converter 24 which is connected on one end to the power line 10 and on the other end to the electrical outlets 18, to the seat control devices 14 and to the video screens 16 in order to supply them with electric power after the conversion thereof.

The control module 22 comprises a clock, a memory and a computing unit. It consists, for example, of a microcontroller. The control module 22 is connected to each electrical outlet 18 in order to receive therefrom a distribution request that is generated by each electrical outlet 18 after the physical introduction of a plug of an electronic device 20 therein.

In addition, a switch 26 is connected between each electrical outlet 18 and the converter 24. The opening and closing of the switches 26 is controlled by the control module 22.

A plurality of current sensors 28 are connected to the input of the seat control devices 14 and the video screens 16. The current sensors 30 are also connected to the input of each electrical outlet 18 and a current sensor 32 is connected to the input of the power converter 24. All of these current sensors 28, 30 and 32 are capable of delivering electric current measurements to the control module 22.

Alternatively, the distribution unit 8 does not comprise a current sensor 32 at the input to the converter 24. The amount of current consumed by the distribution unit 8 is then obtained by summing the currents measured by the current sensors 28 and 30. The current consumed by the electronic components of the distribution unit are thus ignored.

Figure 3:
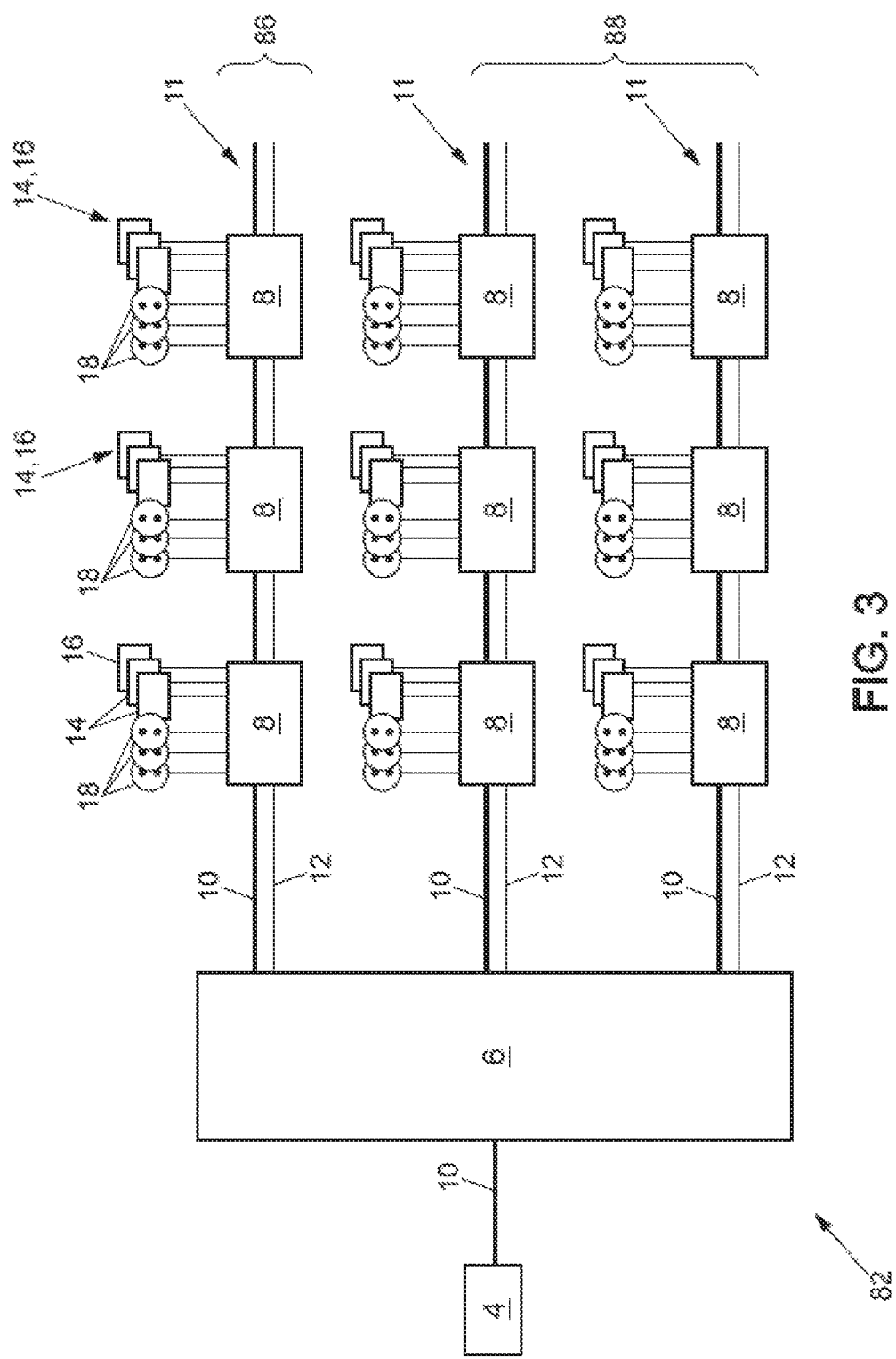
FIG. 3 is a diagram showing a distribution system having multiple columns, in which the method according to the invention may be implemented.

The method according to the invention can also be implemented in a distribution system 82 with a plurality of columns 11 as shown in FIG. 3. This distribution system 82 is similar to the one shown in FIG. 1. The components of the distribution system shown in FIG. 3 that are identical to the components of the distribution system shown in FIG. 1 have the same reference numerals and will not be described again.

In this distribution system 82, the power line 10 from the power source 4 is shunted in the control unit 6 to a plurality of power lines 10 to which the distribution units 8 are serially connected. Each set of distribution units 8 connected to the same power line 10 forms a column 11.

According to a first embodiment of the distribution method according to the invention, the communication line 12 is unidirectional, and the distribution method according to the invention is implemented by each control module 22 of each distribution unit 8 for the electrical outlets 18 of the distribution unit 8. The safety threshold, maximum threshold and hysteresis threshold are defined for the set of electrical outlets 18 of each distribution unit 8. They are called the safety threshold of the outlets $S_S^{outlets}$, maximum threshold of the outlets $S_M^{outlets}$, and hysteresis threshold of the outlets $S_H^{outlets}$.

Figure 4:
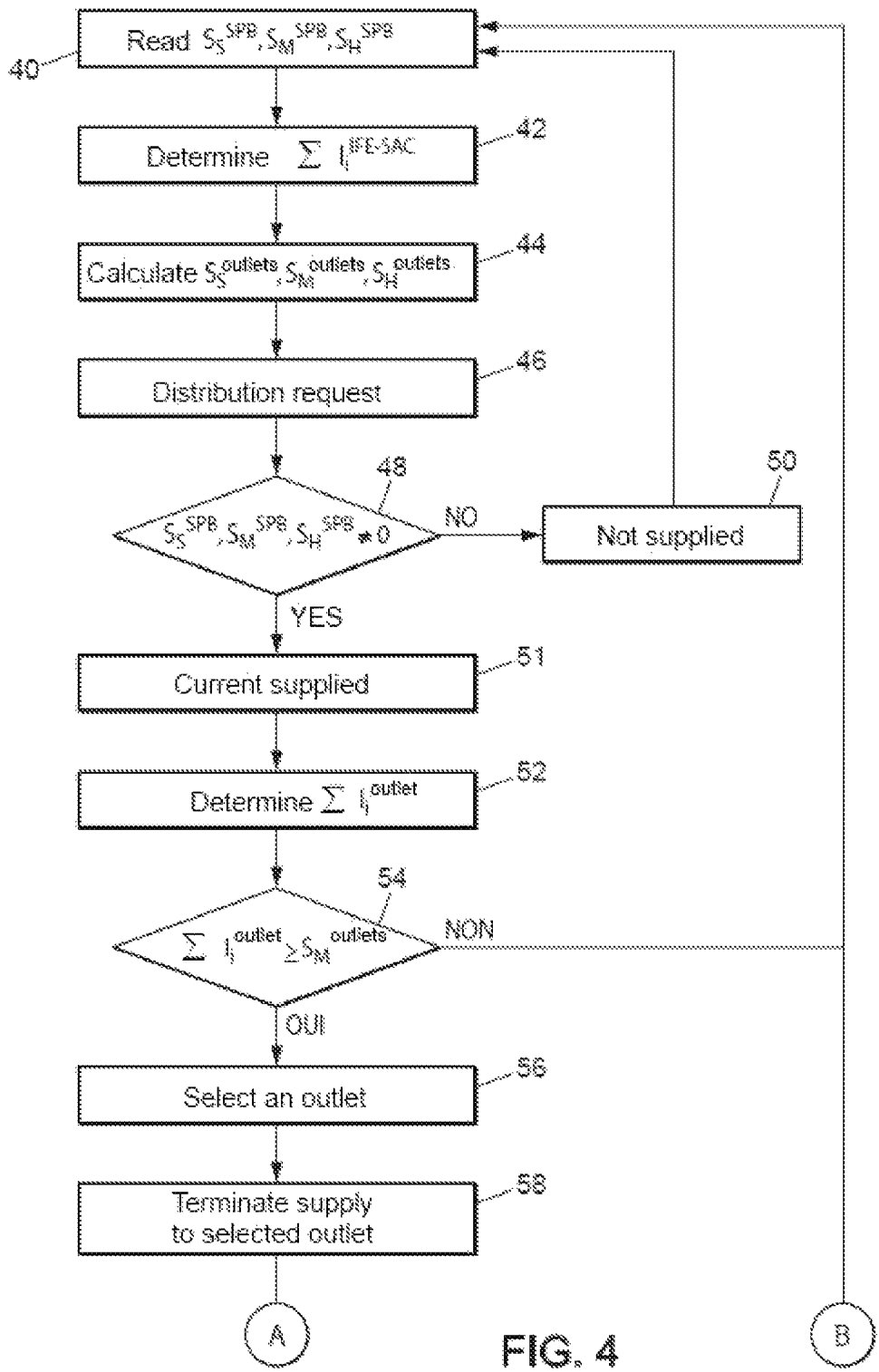
FIG. 4 is a flowchart showing a part of the steps of the method according to the invention.
Figure 5:
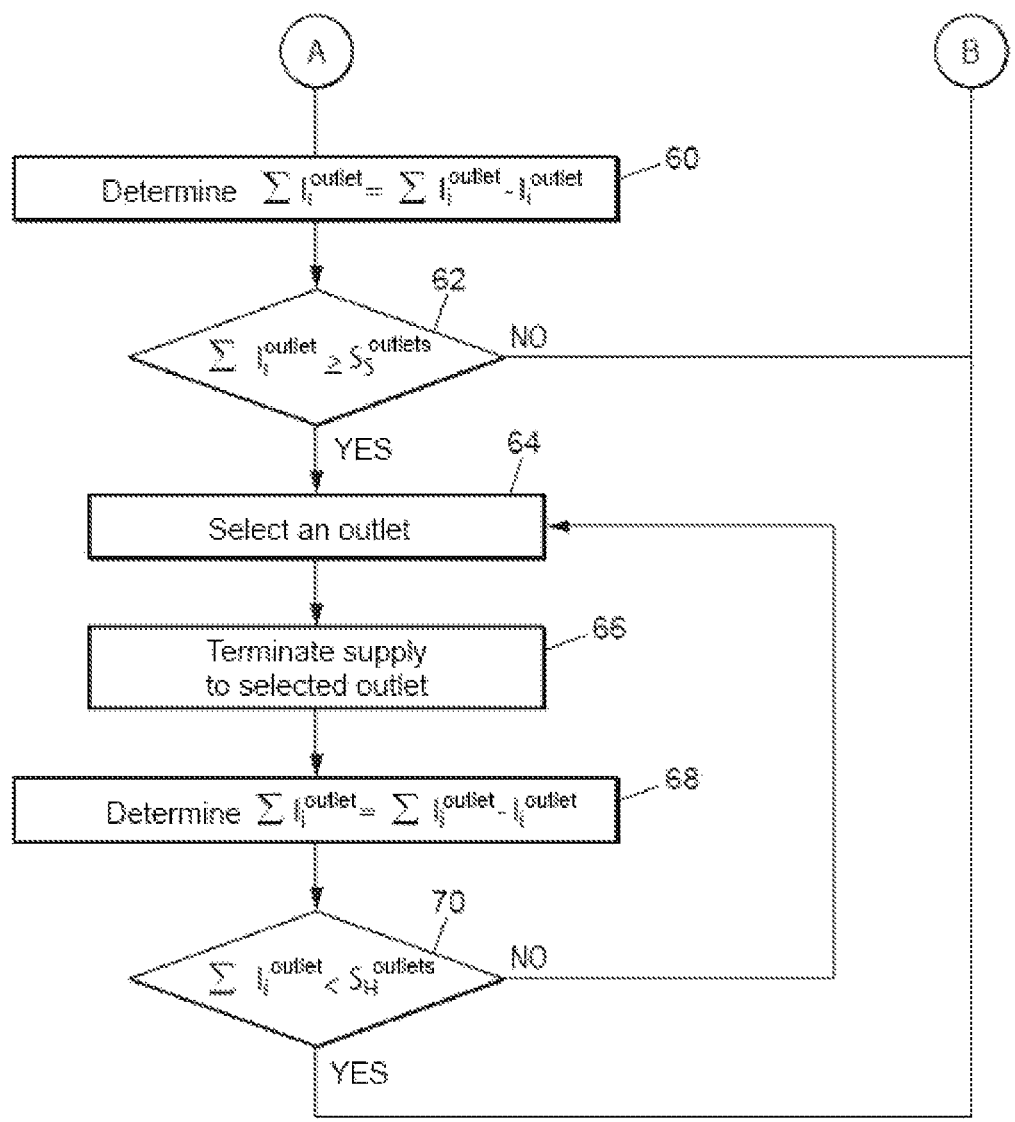
FIG. 5 is a flowchart showing another part of the steps of the method according to the invention.

With reference to FIGS. 4 and 5, this distribution method begins with a step 40, in which the control module 22 reads on the communication line 12 the thresholds transmitted by the control unit 6.

During a step 42, the current sensors 28 determine the intensity of the instantaneous current consumed by all the seat control devices 14 and all the video screens 16 that are connected to the distribution unit 8.

Then, during a step 44, the control module 22 calculates a safety threshold of the outlets $S_S^{outlets}$, a maximum threshold of the outlets $S_M^{outlets}$, and a hysteresis threshold of the outlets $S_H^{outlets}$, using the following formulas:

$$S_S^{outlets} = S_S^{PCB} - \Sigma I^{IFE-SAC}$$

$$S_M^{outlets} = S_M^{PCB} - \Sigma I^{IFE-SAC}$$

$$S_H^{outlets} = S_H^{PCB} - \Sigma I^{IFE-SAC}$$

in which:
$\Sigma I^{IFE-SAC}$ is the instantaneous current consumed by all the seat control devices and video screens, determined in step 42, and
$S_S^{PCB}$, $S_M^{PCB}$, $S_H^{PCB}$ respectively are a unit safety threshold, a unit maximum threshold and a unit hysteresis threshold; these thresholds were read in step 40.

When the control module 22 receives a request for distribution from an electric outlet 18 in a step 46, it first checks in step 48 that the value for the thresholds read in step 40 is not zero.

If the thresholds have a value of zero, the control module 22 controls the switch 26 in a step 50 so that it remains open and the electrical outlet 18 that made the distribution request does not receive electric current.

If the thresholds have a value different from zero, the control module 22 controls the switch 26 in a step 51 so that it is closed and the electrical outlet 18 that made the request receives electric current. The control module 22 records and totals the current supplied by the electrical outlet 18 in order to determine the cumulative intensity of the electric current delivered by this electrical outlet at any moment. Thus, the control module 22 stores and periodically updates the cumulative intensity of the electric current delivered by each electrical outlet 18 of the distribution unit 8.

The control module 22 then determines, in a step 52, the instantaneous current distributed by all electrical outlets 18 of the distribution unit 8 by summing all the current intensities measured by the current sensors 30.

In a step 54, the control module 22 checks whether the current intensity determined in step 52 is greater than or equal to the maximum threshold of the outlets $S_M^{outlets}$. If this current intensity is below the maximum threshold of the outlets $S_M^{outlets}$, the distribution method returns to step 40. If this current intensity is greater than or equal to the maximum threshold of the outlets $S_M^{outlets}$, the control module 22 selects an electrical outlet 18 in a step 56. The selected electrical outlet 18 is the electrical outlet that has distributed the highest cumulative intensity of electric current since the beginning of the step 51 in which electric current was supplied to this electrical outlet 18.

In a step 58, the control module 22 controls the termination of the distribution of electric current to the selected electrical outlet 18 by controlling the switch 26 connected to the electrical outlet. The control module 22 stores the moment the electrical outlet 18 is disconnected and sets to zero the cumulative current supplied to the electrical outlet 18.

Steps 46-54 are repeated each time a passenger inserts a plug into an electrical outlet 18. The distribution of current achieved by the method according to the invention is therefore more fair, because passengers whose electronic devices 20 have not yet consumed current can still receive it even if they plug their electronic devices to the electrical outlets 18 belatedly. Indeed, a passenger who makes a request for distribution of electric current, even after an hour of flight, by plugging his electronic device into an electrical outlet 18 will still receive current except in extreme cases determined by the control unit 6, such as during takeoff and landing of the aircraft for example. In contrast, a passenger whose electronic device 20 has already consumed a lot of current since the beginning of his connection to an electrical outlet 18 will no longer receive current for a given time, as explained below.

To ensure that the current intensity distributed to the seat control devices 14, video screens 16 and electrical outlets 18 is always less than the power available in the power source 4, the distribution method according to the invention also comprises a step wherein the current intensity that is distributed to the electrical outlets 18 is compared to a safety threshold of the outlets $S_S^{outlets}$.

To this end, in a step 60, the control module 22 determines the instantaneous electric current supplied by the electrical outlets 18 of the distribution unit 8 after stopping distribution to the selected electrical outlet 18. This determination can be made either by adding the currents measured by the current sensors 30 or from the current intensity determined in step 52 from which the current delivered to the disconnected electrical outlet will be removed.

Then, in a step 62, the instantaneous current intensity supplied by all of the electrical outlets 18 of the distribution unit 8 as determined in step 60 is compared to the safety threshold of the outlets $S_S^{outlets}$. If the current intensity determined in step 60 is less than the safety threshold of the outlets $S_S^{outlets}$, the distribution method returns to step 40. If this current is greater than or equal to the safety threshold of the outlets $S_S^{outlets}$, the control module 22 selects a new electrical outlet 18, in a step 64, for example according to the same criterion as in step 56, namely selecting the electrical outlet having the highest cumulative current intensity since the step 51 in which electric current was supplied to the electrical outlet 18.

In a step 66, the control module 22 stops the supply of electric current to the electrical outlet 18 selected in step 64, stores the moment the electrical outlet 18 is disconnected, and sets to zero the cumulative current intensity consumed by the electrical outlet 18.

In a step 68, the control module 22 determines the instantaneous electric current intensity supplied by the electrical outlets 18 of the distribution unit 8 after the supply of current to the selected electrical outlet 18 is stopped.

In a step 70, the current intensity determined in step 68 is compared to a hysteresis threshold of the outlets $S_H^{outlets}$. The difference between the safety threshold of the outlets $S_S^{outlets}$ and the hysteresis threshold of the outlets $S_H^{outlets}$ corresponds to a hysteresis designed to guarantee the stability of the distribution method. The hysteresis threshold of the outlets $S_H^{outlets}$ is proportional to the safety threshold of the outlets $S_S^{outlets}$. It is, for example, equal to 75% of the safety threshold of the outlets $S_S^{outlets}$.

If the current intensity determined in step 68 is less than the hysteresis threshold of the outlets $S_H^{outlets}$, the distribution method returns to step 40.

If this current intensity is greater than or equal to the hysteresis threshold of the outlets $S_H^{outlets}$, the method returns to the step 64 of selecting an electrical outlet 18 and terminating the supply of electric current to the selected electrical outlet 18. Steps 64 to 70 are repeated and the power is cut off, outlet by outlet, until the instantaneous current delivered to all outlets 18 of the distribution unit is less than the hysteresis threshold of the outlets $S_H^{outlets}$.

Alternatively, the selection criterion for an outlet in the steps 56 and 64 is the selection of an electrical outlet having the highest instantaneous consumption.

In another variant, the outlet selected in steps 56 and 64 is the electrical outlet that has been connected to an electronic device 20 for the longest duration. In this case, the step wherein distribution is requested 46 comprises a step to store the start time of the supply of current, and the steps 58 and 66 of terminating the supply of current to the selected outlet include resetting the supply start time to zero.

Figure 6:
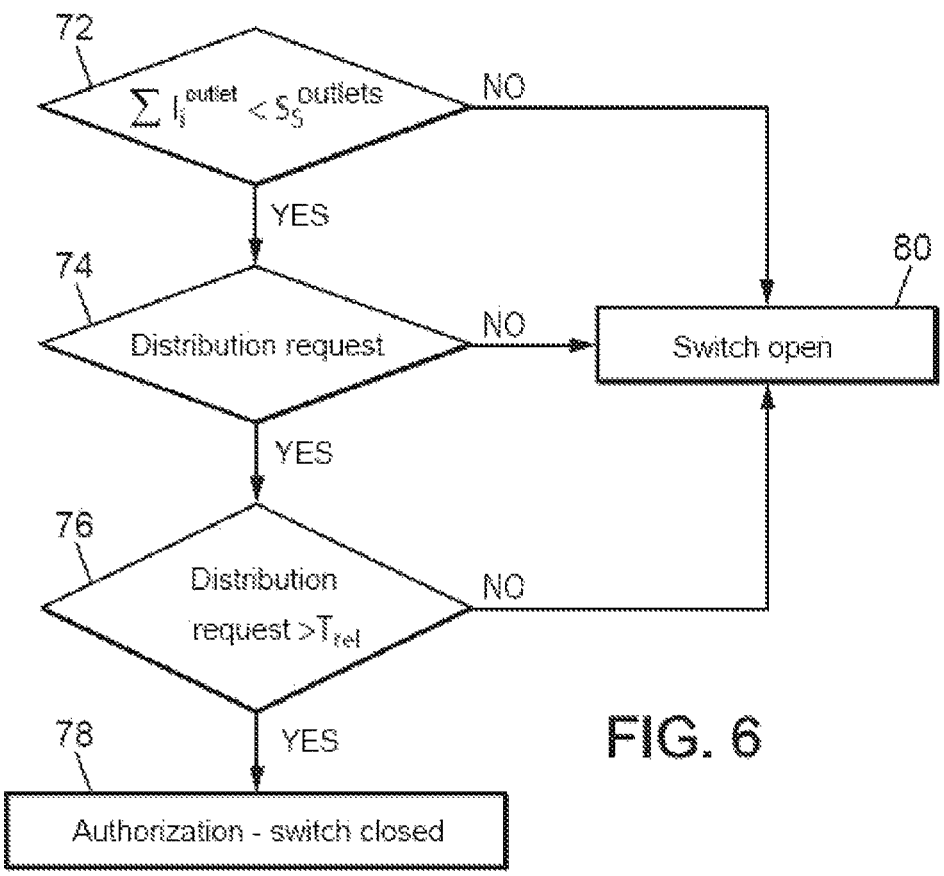
FIG. 6 is a flowchart showing steps of the method according to the invention, in which electric current is distributed to an electrical outlet after the supply of current thereto has been shut off.

With reference to FIG. 6, the method further comprises a loop to distribute current to an electrical outlet 18 for which distribution was stopped, after a time called the relaxation time $T_{rel}$.

Thus, if, during a step 72, the instantaneous current supplied by all of the electrical outlets 18 of the distribution unit 8 is less than the safety threshold of the outlets $S_S^{outlets}$, and if, during a step 74, an electrical outlet 18 sends to the control module 22 a request for distribution, the control module 22 checks whether the period of time since the moment the supply to the electrical outlet 18 was terminated, which was stored in steps 58 or 66, is greater than the relaxation time $T_{rel}$.

If so, the control module 22 orders the switch 26 mounted on the supply line of the electrical outlet 18 to close. After closing the switch 26, the control module 22 records and totals the current delivered by the electrical outlet 18 in order to be able to determine at any time the cumulative current intensity delivered by the electrical outlet. In addition, the new distribution request will actually not be taken into account unless the user removes the plug of the electronic device 20 from the electrical outlet 18 and reinserts it.

If not, the control module 22 leaves the switch 26 open, in a step 80.

The relaxation time $T_{rel}$ is not a constant value. It is calculated by the control module 22 for each outlet. The relaxation time $T_{rel}$ is, for example, a proportion or a affine function of the cumulative intensity of electric current consumed by the electrical outlet 18 for which distribution was stopped. The intensity of electric current consumed is cumulated since the beginning of the step of supplying current to that electrical outlet 18.

In the variant embodiment in which the electrical outlet 18 selected in steps 56 and 64 is the electrical outlet that has been connected to an electronic device 20 for the longest time, the control module 22 also stores in step 78 the time at which the electrical outlet 18 was connected.

The first embodiment of the invention has a drawback. If several passengers have their electronic devices connected to a single distribution unit, the supply of power will be terminated more quickly for these passengers than for a smaller number of other passengers connected to another distribution unit. The current not consumed by some distribution units is not distributed to other distribution units. The second embodiment of the invention partly overcomes this problem.

The second embodiment of the distribution method according to the invention is implemented in a distribution system 82 that has a plurality of columns 11 and a bidirectional communication line 12.

According to the second embodiment, the distribution method described in relation to FIGS. 4, 5 and 6 is implemented by the control unit 6 for all the electrical outlets 18 of the distribution units 8 of the column 11. The safety threshold, maximum threshold and hysteresis threshold are the thresholds defined for the set of electrical outlets 18 of the distribution units 8 of each column 11, based on the safety threshold $S_S$, maximum threshold $S_M$ and hysteresis threshold $S_H$ predefined for the entire cabin. These are called the column safety threshold $S_S^{col}$, column maximum threshold $S_M^{col}$, and column hysteresis threshold $S_H^{col}$.

The steps of the method are similar to those described in the first embodiment and will not be described again. Only the features specific to this embodiment are described below.

In this case, step 40 is replaced by a step in which each distribution unit 8 transmits to the control unit 6, via the communication line 12, the value of the instantaneous current supplied by each electrical outlet 18 as well as the value of the instantaneous current consumed by the seat control devices 14 and video screens 16.

In step 42, the control unit 6 determines the instantaneous current consumed by the seat control devices 14 and the video screens 16 that are connected to all distribution units 8 of the column 11.

In step 44, the column maximum threshold $S_M^{col}$, the column safety threshold $S_S^{col}$, and the column hysteresis threshold $S_H^{col}$ are calculated for each column, based on predefined thresholds for the entire cabin according to the formulas below.

$$S_M^{col} = (S_M/C) - I_{inst}^{IFE-SAC}$$

$$S_S^{col} = (S_S/C) - I_{inst}^{IFE-SAC}$$

$$S_H^{col} = (S_H/C) - I_{inst}^{IFE-SAC}$$

in which:
$S_S$ is the safety threshold predefined for the entire cabin,
$S_M$ is the maximum threshold predefined for the entire cabin,
$S_H$ is the hysteresis threshold predefined for the entire cabin, $I_{inst}^{IFE-SAC}$ the instantaneous electric current consumed by the seat control devices 14 and the video screens 16 that are connected to all of the distribution units 8 of each column 11, C is the number of columns in the system.

In step 46, the distribution requests for an electrical outlet 18 are received by the control module 22 of each distribution unit and are transmitted to the control unit 6 by the communication line 10.

In steps 54, 62 and 70, the current intensity distributed to all the electrical outlets 18 of the distribution units 8 of the column 11 is compared to the maximum threshold of the column $S_M^{col}$, the safety threshold of the column $S_S^{col}$, and the hysteresis threshold of the column $S_H^{col}$ which were calculated in step 44.

The electrical outlet selected in steps 56 and 64 is the electrical outlet that has the highest cumulative current intensity among all the electrical outlets of the distribution units 8 of the column 11.

The distribution method according to the second embodiment of the invention, implemented in a distribution system 82 having a plurality of columns 11, may comprise an improvement in which the column maximum threshold $S_M^{col}$, the column safety threshold $S_S^{col}$ and the column hysteresis threshold $S_H^{col}$ vary over time according to the instantaneous current demanded by the electrical outlets 18 of the distribution units 8 in each column, by reallocating electric current from a column where passengers have few electronic devices 20 plugged into the electrical outlets 18 to another column where the demand for electric current is greater.

Figure 7:
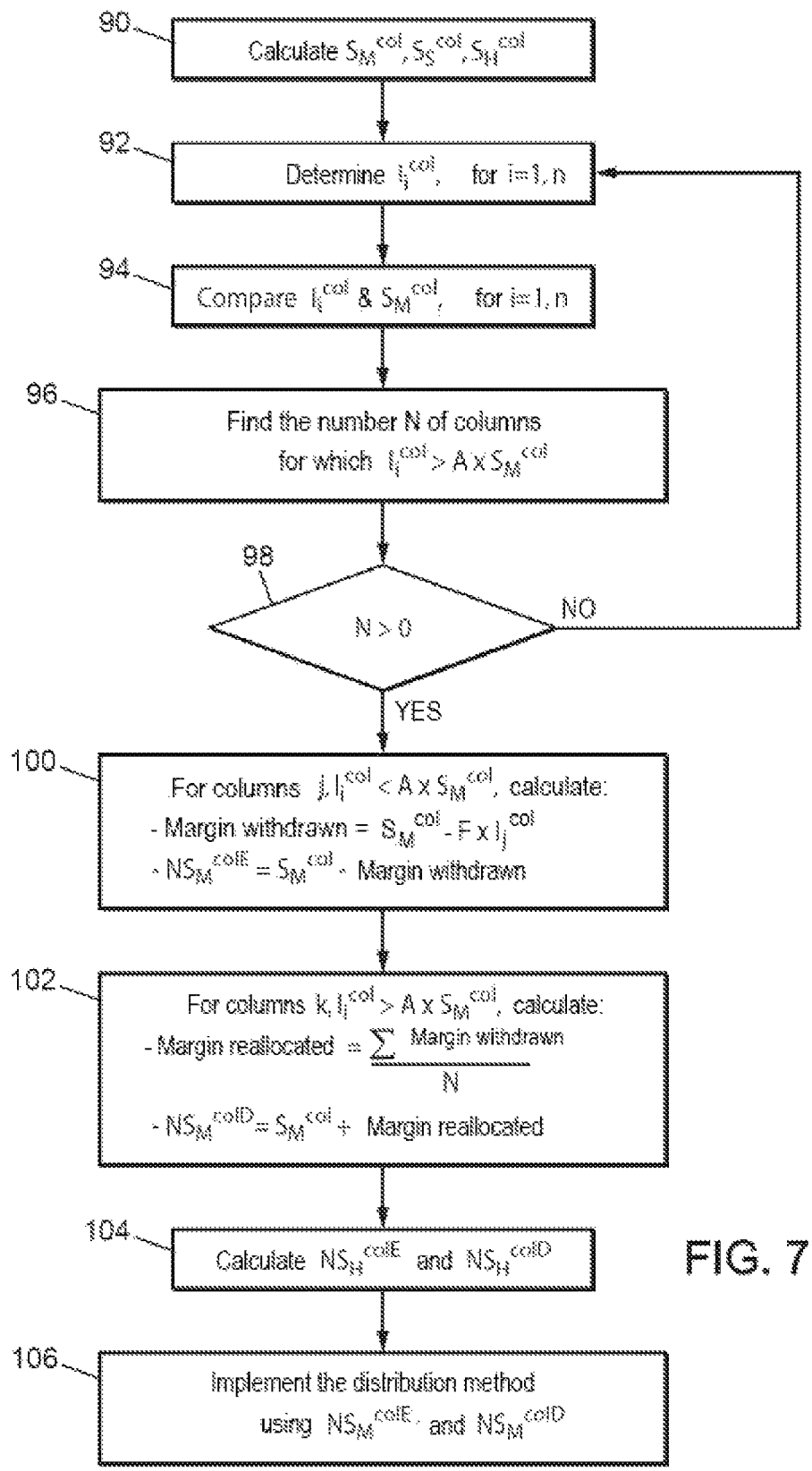
FIG. 7 is a flowchart showing steps of the method according to the invention, in which the power-distribution management thresholds are dynamically varied from one column to another.

To this end, in a step 90 shown in FIG. 7, the control unit 6 calculates the maximum threshold $S_M^{col}$, the safety threshold $S_S^{col}$ and the hysteresis threshold $S_H^{col}$ defined for each column 11 of the distribution system 82 from the following formulas:

$$S_M^{col} = S_M/\text{number of columns}$$

$$S_S^{col} = S_S/\text{number of columns}$$

$$S_H^{col} = S_H \times B$$

in which:

B is a predefined percentage, such as 75% for example, $S_M$, $S_S$ and $S_H$ respectively are the maximum threshold, the safety threshold and the hysteresis threshold defined for all the electrical outlets 18 of the distribution system 82.

In a step 92, the control unit 6 determines the instantaneous current intensity $I_i^{col}$ delivered to the electrical outlets 18 of the distribution units 8 of each column 11 by means of the current sensors mounted in the control unit 6 on each power line 10.

During a step 94, the control unit 6 compares the current intensity $I_i^{col}$ for each column measured in step 92 with the maximum threshold $S_M^{col}$ defined in step 90 for each column.

In a step 96, the control unit 6 looks for the number N of columns for which the current intensity $I_i^{col}$ determined in step 92 is greater than a predefined percentage A of the column maximum threshold $S_M^{col}$. These columns are referred to hereafter as columns with a deficit 86 of electric current, meaning the columns for which the current intensity $I_i^{col}$ requested and distributed (as determined in step 92) exceeds or is only slightly below the column maximum threshold $S_M^{col}$. The predetermined percentage A is, for example, between 80 and 99%, and is preferably equal to 95%. This percentage defines a margin to avoid instability from successive threshold changes. The columns for which the current intensity $I_i^{col}$ determined in step 92 is less than the predetermined percentage A of the maximum threshold of the column $S_M^{col}$ are hereafter referred to as columns with a surplus 88.

In a step 98, the control unit 6 checks whether the number N of columns with a deficit 86 is greater than 0.

If this number N is equal to 0, the method returns to the determination step 92. In this case, the instantaneous current intensity delivered to the electrical outlets 18 of the distribution units 8 of all the columns 11 is well below the maximum threshold $S_M^{col}$, including the margin. No column maximum threshold is changed.

If this number N is greater than 0, the control unit 6 calculates in a step 100, for each column with a surplus 88, the margin that may be withdrawn from that column and the new maximum threshold $NS_M^{colE}$ specific to that column, using the following formulas:

$$\text{Margin withdrawn} = S_M^{col} - F \times I_j^{col}$$

$$NS_M^{colE} = S_M^{col} - \text{Margin withdrawn}$$

in which:

F is a predetermined factor. It is for example between 101 and 120%, preferably equal to 105%.

$I_j^{col}$ is the instantaneous current intensity delivered to the electrical outlets 18 of the distribution units 8 of the column j.

$S_M^{col}$ is the maximum threshold defined in step 90 for all columns.

Margin withdrawn is the difference in current intensity between the maximum threshold of the column and the instantaneous current intensity actually distributed in this column j;

$NS_M^{colE}$ is the new maximum threshold $NS_M^{colE}$ calculated for column j and specific thereto.

Then, in a step 102, the control unit 6 calculates the margin reallocated and the new maximum threshold $NS_M^{colD}$ defined for all columns with a deficit 86, using the following formula:

$$\text{Margin reallocated} = \frac{\Sigma \text{ Margin withdrawn}}{N}$$

$$NS_M^{colD} = S_M^{col} + \text{Margin reallocated}$$

In which:

Σ Margin withdrawn is the sum of the margins withdrawn that are calculated in step 100 for each column with a surplus 88; the summing is done on the margins N is the number of columns with a deficit 86.

$S_M^{col}$ is the maximum threshold defined in step 90 for all columns.

$NS_M^{colD}$ the new maximum threshold defined for all columns with a deficit.

In a step 104, the control unit 6 calculates a new hysteresis threshold $NS_H^{colE}$ specific to each column with a surplus 88, from the new maximum threshold $NS_M^{colE}$ calculated for each column with a surplus 88, as well as a new hysteresis threshold $NS_H^{colD}$ defined for all columns with a deficit 86, from the new maximum threshold $NS_M^{colD}$ calculated for all columns with a deficit 86. To this end, each new hysteresis threshold $NS_H^{colE}$, $NS_H^{colD}$ is a percentage of the new calculated maximum thresholds $NS_M^{colE}$, $NS_M^{colD}$.

In a step 106, the steps of the distribution method shown in FIGS. 4 and 5 are implemented, using the new maximum threshold $NS_M^{colE}$ and the new hysteresis threshold $NS_H^{colE}$ specific to each column with a surplus 88, on the distribution units 8 of the corresponding column with a surplus 88, and using the new maximum threshold $NS_M^{colD}$ and the new hysteresis threshold $NS_H^{colD}$ defined for all columns with a deficit 86, on the distribution units 8 of the columns with a deficit 86. Meanwhile, the safety threshold $S_S^{col}$ remains unchanged.

Advantageously, the method described with reference to FIG. 7 allows dynamically varying the power thresholds from one column to another in order to distribute the maximum amount of power available at each moment to the maximum number of passengers who request electric current by connecting their electronic devices.

The invention also relates to a computer program stored on an information storage medium, said program comprising instructions for implementing the delivery method described above when this program is executed by a computer system.

The distribution method that allows changing the value of the maximum threshold and hysteresis threshold for each column 11 may be implemented independently of the distribution method shown in FIG. 3. In particular, it can be implemented with any other method of distributing electrical power in a distribution system 82 with a plurality of columns, such as the one illustrated in FIG. 3.

The step of selecting an electrical outlet chosen according to the criterion of choosing the electrical outlet having supplied the highest cumulative instantaneous current may be implemented in any distribution method comprising a step of selecting and terminating the distribution of current to an electrical outlet. This distribution method may be different from the method described in reference to FIGS. 4 and 5; it can be, for example, the distribution method described in EP 0870354 or the French patent application 1159422 filed on behalf of the applicant.

What is claimed is:

1. A method of distributing electric current from a power source to a plurality of electrical outlets in a transport vehicle, the method being implemented by a distribution system that comprises a central source of electric power and at least one set of distribution units, referred to as a column, comprising a plurality of local distribution units that are connected to each other and to the power source by a power line; each distribution unit being equipped with a control module and a plurality of electrical outlets capable of transmitting a distribution request to the control module when electronic devices are connected to electrical outlets among said plurality of electrical outlets; wherein the method comprises, for the plurality of electrical outlets of at least one distribution unit, the steps of:
   a) reception of a distribution request, said distribution request being transferred from an electrical outlet, called waiting electrical outlet to a control module, upon connection of an electronic device to said electrical outlet;
   b) supplying of electric current to said waiting electrical outlet, the step of supplying having a beginning;
   c) determining an instantaneous electric current intensity supplied to all the electrical outlets already connected to an electronic device;
   d) comparing the instantaneous electric current intensity determined in step c) to a threshold referred to as a maximum threshold ($S_M^{outlets}$, $S_M^{col}$);
   e) if the instantaneous electric current intensity determined in step c) is greater than said maximum threshold ($S_M^{outlets}$, $S_M^{col}$), and
   f) comparing the current intensity determined in step c) with a threshold referred to as a safety threshold ($S_S^{outlets}$, $S_M^{col}$), said safety threshold ($S_S^{outlets}$, $S_S^{col}$) being greater than said maximum threshold ($S_M^{outlets}$, $S_M^{col}$);
   wherein if the current intensity determined in step c) is greater than said safety threshold ($S_S^{outlets}$, $S_S^{col}$),
      g) selecting an electrical outlet and terminating the supplying of electric current to said selected electrical outlet;
      h) determining the current intensity supplied by the plurality of electrical outlets of said distribution unit; and
      i) comparing the current intensity determined in step h) to a threshold referred to as an hysteresis threshold ($S_H^{outlets}$, $S_H^{col}$), said hysteresis threshold ($S_H^{outlets}$, $S_H^{col}$) being less than said maximum threshold ($S_M^{outlets}$, $S_M^{col}$),
   wherein if the current intensity determined in step h) is greater than said hysteresis threshold ($S_H^{outlets}$, $S_H^{col}$), repeating steps g) to i), and
   wherein if the current intensity determined in step h) is less than said hysteresis threshold ($S_H^{outlets}$, $S_H^{col}$), the method returns to step c) of determining the current intensity supplied to the electrical outlets,
   for each electrical outlet of the at least one distribution unit,
      computing a cumulative intensity of electric current supplied to each electrical outlet since the beginning of the step of supplying current to that electrical outlet;
      selecting the electrical outlet that has supplied a highest cumulative intensity of electric current among the electrical outlets of said at least one distribution unit; and
      terminating the supply of current to said selected electrical outlet.

2. The distribution method according to claim 1, wherein each distribution unit is capable of distributing electric current to seat control devices and video screens, and wherein the maximum threshold ($S_M^{outlets}$, $S_M^{col}$) varies according to the instantaneous consumption of said seat control devices and said video screens.

3. The distribution method according to claim 1, wherein steps a) to e) are applied by the control module of a distribution unit solely to the electrical outlets of this distribution unit.

4. The distribution method according to claim 1, wherein, when the current intensity determined in step c) is less than said maximum threshold ($S_M^{outlets}$, $S_M^{col}$), the method returns to step a).

5. The distribution method according to claim 1, said method being implemented in a distribution system having a plurality of columns, each column comprising a plurality of distribution units connected to each other and to the power source by a power line; the method further comprises the following steps:
   determining the instantaneous current intensity supplied to the electrical outlets of the distribution units of each column;
   comparing the determined instantaneous current intensity to a predetermined percentage, A, of a column maximum threshold ($S_M^{col}$);
   calculating a new maximum threshold ($NS_M^{colE}$) specific to each column, in which the instantaneous current intensity of the current delivered to the electrical outlets of the distribution units is less than said predetermined percentage, A, of said maximum threshold ($S_M^{col}$); said columns being referred to as columns with a surplus; and calculating a new maximum threshold ($NS_M^{colD}$) defined for all of the columns, in which the instantaneous current intensity of the current delivered to the electrical outlets of the distribution units is greater than said predetermined percentage, A, of said maximum threshold ($S_M^{col}$), said columns being referred to as columns with a deficit;

implementing steps a) to e) of the distribution method according to claim 1, using said new maximum threshold ($NS_M^{colE}$) specific to each column with a surplus, on the distribution units of each column with a surplus, and using said new maximum threshold ($NS_M^{colD}$) defined for all of the columns with a deficit, on the distribution units of the columns with a deficit.

6. The distribution method according to claim 5, wherein the step of calculating a new maximum threshold ($NS_M^{colE}$) specific to each column with a surplus comprises, for each column with a surplus, the following steps:

calculating a difference between the maximum threshold ($S_M^{col}$) and a current intensity factor, F, for the electric current distributed to the electrical outlets of the distribution units of each column with a surplus; and calculating the new maximum threshold ($NS_M^{colE}$) specific to each column with a surplus, from said difference calculated for that column with a surplus, and wherein the calculation of the new maximum threshold ($NS_M^{colD}$) defined for all of the columns with a deficit is a function of a sum of said differences calculated for all columns with a surplus.

7. The distribution method according to claim 5, which comprises the following steps:

calculating a new hysteresis threshold ($NS_H^{SPBE}$) specific to each column with a surplus, from the new maximum threshold ($NS_H^{SPBD}$) specific to each column with a surplus;

calculating a new hysteresis threshold ($NS_H^{SPBD}$) defined for all the columns with a deficit, from the new maximum threshold ($NS_M^{colD}$) defined for all the columns with a deficit.

8. A non-transitory computer-readable storage medium with an executable program executed by a computer, said executable program comprising instructions for implementing the distribution method according to claim 1.

9. A method of distributing electric current from a power source to a plurality of electrical outlets in a transport vehicle, the method being implemented by a distribution system that comprises a central source of electric power and at least one set of distribution units, referred to as a column, comprising a plurality of local distribution units that are connected to each other and to the power source by a power line; each distribution unit being equipped with a control module and a plurality of electrical outlets capable of transmitting a distribution request to the control module when electronic devices are connected to electrical outlets among said plurality of electrical outlets; wherein the method comprises, for the plurality of electrical outlets of at least one distribution unit, the steps of:

a) reception of a distribution request, said distribution request being transferred from an electrical outlet, called waiting electrical outlet to a control module, upon connection of an electronic device to said electrical outlet;

b) supplying of electric current to said waiting electrical outlet, the step of supplying having a beginning;

c) determining an instantaneous electric current intensity supplied to all the electrical outlets already connected to an electronic device;

d) comparing the instantaneous electric current intensity determined in step c) to a threshold referred to as a maximum threshold ($S_M^{outlets}$, $S_M^{col}$);

e) if the instantaneous electric current intensity determined in step c) is greater than said maximum threshold ($S_M^{outlets}$, $S_M^{col}$), for each electrical outlet of the at least one distribution unit, computing a cumulative intensity of electric current supplied to each electrical outlet since the beginning of the step of supplying current to that electrical outlet;

selecting the electrical outlet that has supplied a highest cumulative intensity of electric current among the electrical outlets of said at least one distribution unit; and terminating the supply of current to said selected electrical outlet, said method being implemented in a distribution system having a plurality of columns, each column comprising a plurality of distribution units connected to each other and to the power source by a power line; the method further comprising the following steps:

determining the instantaneous current intensity supplied to the electrical outlets of the distribution units of each column;

comparing the determined instantaneous current intensity to a predetermined percentage, A, of a column maximum threshold ($S_M^{col}$);

calculating a new maximum threshold ($NS_M^{colE}$) specific to each column, in which the instantaneous current intensity of current delivered to the electrical outlets of the distribution units is less than said predetermined percentage, A, of said maximum threshold ($S_M^{col}$); said columns being referred to as columns with a surplus; and calculating a new maximum threshold ($NS_M^{colD}$) defined for all of the columns, in which the instantaneous current intensity of current delivered to the electrical outlets of the distribution units is greater than said predetermined percentage, A, of said maximum threshold ($S_M^{col}$), said columns being referred to as columns with a deficit;

implementing steps a) to e) of the distribution method, using said new maximum threshold ($NS_M^{colE}$) specific to each column with a surplus, on the distribution units of each column with a surplus, and using said new maximum threshold ($NS_M^{colD}$) defined for all of the columns with a deficit, on the distribution units of the columns with a deficit.

10. The distribution method according to claim 9, wherein each distribution unit is capable of distributing electric current to seat control devices and video screens, and wherein the maximum threshold ($S_M^{outlets}$, $S_M^{col}$) varies according to the instantaneous consumption of said seat control devices and said video screens.

11. The distribution method according to claim 9, wherein steps a) to e) are applied by the control module of a distribution unit solely to the electrical outlets of this distribution unit.

12. The distribution method according to claim 9, wherein, when the current intensity determined in step c) is less than said maximum threshold ($S_M^{outlets}$, $S_M^{col}$) the method returns to step a).

13. The distribution method according to claim 9, which further comprises the following steps:
   f) comparing the current intensity determined in step c) with a threshold referred to as a safety threshold ($S_S^{outlets}$, $S_S^{col}$), said safety threshold ($S_S^{outlets}$, $S_S^{col}$) being greater than said maximum threshold ($S_M^{outlets}$, $S_M^{col}$); and
   wherein if the current intensity determined in step c) is greater than said safety threshold ($S_S^{outlets}$, $S_S^{col}$),
   g) selecting an electrical outlet and terminating the supplying of electric current to said selected electrical outlet;
   h) determining the current intensity supplied by the plurality of electrical outlets of said distribution unit; and
   i) comparing the current intensity determined in step h) to a threshold referred to as an hysteresis threshold ($S_H^{outlets}$, $S_H^{col}$), said hysteresis threshold ($S_H^{outlets}$, $S_H^{col}$) being less than said maximum threshold ($S_M^{outlets}$, $S_H^{col}$),
   wherein if the current intensity determined in step h) is greater than said hysteresis threshold ($S_H^{outlets}$, $S_H^{col}$), repeating steps g) to i), and
   wherein if the current intensity determined in step h) is less than said hysteresis threshold ($S_H^{outlets}$, $S_H^{col}$); the method returns to step c) of determining the current intensity supplied to the electrical outlets.

14. The distribution method according to claim 9, wherein the step of calculating a new maximum threshold ($NS_M^{colE}$) specific to each column with a surplus comprises, for each column with a surplus, the following steps:
   calculating a difference between the maximum threshold ($S_M^{col}$) and a current intensity factor, F, for the electric current distributed to the electrical outlets of the distribution units of each column with a surplus; and
   calculating the new maximum threshold ($NS_M^{colE}$) specific to each column with a surplus, from said difference calculated for that column with a surplus, and
   wherein the calculation of the new maximum threshold ($NS_M^{colD}$) defined for all of the columns with a deficit is a function of a sum of said differences calculated for all columns with a surplus.

15. The distribution method according to claim 9, which comprises the following steps:
   calculating a new hysteresis threshold ($NS_H^{SPBE}$) specific to each column with a surplus, from the new maximum threshold ($NS_M^{colE}$) specific to each column with a surplus;
   calculating a new hysteresis threshold ($NS_H^{SPBD}$) defined for all the columns with a deficit, from the new maximum threshold ($NS_M^{colD}$) defined for all the columns with a deficit.

16. A non-transitory computer-readable storage medium with an executable program executed by a computer, said executable program comprising instructions for implementing the distribution method according to claim 9.

* * * * *